United States Patent
Elliott et al.

(10) Patent No.: US 11,003,489 B2
(45) Date of Patent: May 11, 2021

(54) CAUSE EXCEPTION MESSAGE BROADCAST BETWEEN PROCESSING CORES OF A GPU IN RESPONSE TO INDICATION OF EXCEPTION EVENT

(71) Applicant: ARM Limited, Cambridge (GB)

(72) Inventors: Robert Elliott, Cambridge (GB); Vatsalya Prasad, Cambridge (GB); Andreas Engh-Halstvedt, Trondheim (NO)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/125,661

(22) PCT Filed: Mar. 11, 2015

(86) PCT No.: PCT/GB2015/050712
§ 371 (c)(1),
(2) Date: Sep. 13, 2016

(87) PCT Pub. No.: WO2015/136283
PCT Pub. Date: Sep. 17, 2015

(65) Prior Publication Data
US 2017/0004005 A1 Jan. 5, 2017

(30) Foreign Application Priority Data
Mar. 14, 2014 (GB) ..................... 1404585

(51) Int. Cl.
*G06F 9/48* (2006.01)
*G06F 9/38* (2018.01)
*G06F 9/54* (2006.01)

(52) U.S. Cl.
CPC .......... *G06F 9/4812* (2013.01); *G06F 9/3861* (2013.01); *G06F 9/542* (2013.01)

(58) Field of Classification Search
CPC ....... G06F 9/4812; G06F 9/542; G06F 9/3861
See application file for complete search history.

(56) References Cited

U.S. PATENT DOCUMENTS

| 5,469,570 A | 11/1995 | Shibata |
| 5,555,420 A * | 9/1996 | Sarangdhar ............. G06F 13/26 710/266 |

(Continued)

FOREIGN PATENT DOCUMENTS

| CN | 1326037 | 7/2007 |
| CN | 101292226 | 10/2008 |
| CN | 101341548 | 1/2009 |
| CN | 101639803 | 2/2010 |

OTHER PUBLICATIONS

Techterms.com "Processor Core" https://techterms.com/definition/processor_core (Year: 2013).*

(Continued)

*Primary Examiner* — Meng Ai T An
*Assistant Examiner* — Michael W Ayers
(74) *Attorney, Agent, or Firm* — Vierra Magen Marcus LLP

(57) ABSTRACT

A microprocessor system (1) includes a host processor (2), a graphics processing unit (GPU) (3) that includes a number of processing cores (4), and an exception handler. When a thread that is executing on a processing core (4) encounters an exception in its instruction sequence, the thread is redirected to the exception handler. However, the exception event is also communicated to a task manager (5) of the GPU 3. The task manager (5) then broadcasts a cause exception message to each processing core (4). Each processing core then identifies the threads that it is currently executing that the cause exception message relates to, and redirects those threads to the exception handler. In this way, an exception caused by a single thread is broadcast to all threads within a task.

20 Claims, 3 Drawing Sheets

(56) References Cited

U.S. PATENT DOCUMENTS

| | | | | |
|---|---|---|---|---|
| 5,794,047 | A * | 8/1998 | Meier | G06F 9/547 709/203 |
| 6,199,179 | B1 * | 3/2001 | Kauffman | G06F 9/5077 714/11 |
| 7,171,663 | B2 * | 1/2007 | Moore | G06F 9/542 718/1 |
| 7,577,962 | B2 * | 8/2009 | Bendapudi | G06F 9/4812 712/244 |
| 9,298,497 | B2 | 3/2016 | Menon | |
| 2005/0149711 | A1 * | 7/2005 | Zimmer | G06F 9/4812 712/244 |
| 2005/0223302 | A1 * | 10/2005 | Bono | G06F 11/0757 714/55 |
| 2006/0161421 | A1 | 7/2006 | Kissell | |
| 2007/0106990 | A1 | 5/2007 | Kissell | |
| 2008/0320275 | A1 | 12/2008 | Duffy | |
| 2008/0320291 | A1 | 12/2008 | Duffy et al. | |
| 2010/0146522 | A1 | 6/2010 | Duffy | |
| 2011/0078427 | A1 | 3/2011 | Shebanow | |
| 2013/0298133 | A1 * | 11/2013 | Jones | G06F 9/522 718/104 |

OTHER PUBLICATIONS

GB Search Report dated Sep. 29, 2014, GB Patent Application GB1404585.0.
J. Menon, et al., "iGPU: Exception Support and Speculative Execution on GPUs", Proceedings of the 39th Annual International Symposium on Computer Architecture , pp. 72-83, available at http://research.cs.wisc.edu/vertical/papers/2012/isca12-igpu.pdf.
"NVIDIA's Next Generation CUDA Compute Architecture" available at http://www.nvidia.com/content/PDF/fermi_white_papers/NVIDIAFermiComputeArchitectureWhitepaper.pdf.
http://gtp.autm.net/technology/view/24042, Mar. 2016.
PCT International Search Report dated Jun. 4, 2015, PCT Patent Application PCT/GB2015/050712.
PCT Written Opinion of the International Searching Authority dated Jun. 4, 2015, PCT Patent Application PCT/GB2015/050712.
PCT International Preliminary Report on Patentability dated Dec. 14, 2016, PCT Patent Application PCT/GB2015/050712.
Chinese Office Action dated Sep. 4, 2019, Chinese Patent Application No. 201580014083.2.
CN Office Action dated Mar. 11, 2019, CN Patent Application 201580014083.2.

* cited by examiner

CAUSE EXCEPTION MESSAGE BROADCAST BETWEEN PROCESSING CORES OF A GPU IN RESPONSE TO INDICATION OF EXCEPTION EVENT

BACKGROUND

The technology described herein relates to exception handling in microprocessor systems and in particular to exception handling in microprocessor systems in which many threads may be executing independently in parallel.

It is known to provide exception handling mechanisms in which a thread that triggers an exception will set a data state in a defined memory location, for example, that other executing threads periodically poll to determine if the exception has been triggered or not. While this type of exception handling can suffice where there is only a limited number of threads executing in parallel, the Applicants have recognised that such arrangements are not so suitable where there is a large number of threads executing independently in parallel (and which each may need to follow an exception that is triggered). Furthermore, the Applicants have further recognised that situations in which large numbers of threads may be executing in parallel are becoming more common in microprocessor systems. For example, this may arise when using a graphics processing system that includes one or more graphics processing cores (graphics processors) for highly parallel data processing operations (e.g. using OpenCL). In this case, each graphics processing core may support, e.g., up to 256 independent threads.

The Applicants believe therefore that there remains scope for improved arrangements for exception handling in microprocessor systems.

BRIEF DESCRIPTION OF THE DRAWINGS

A number of embodiments of the technology described herein will now be described by way of example only and with reference to the accompanying drawings, in which.

Like reference numerals are used for like features throughout the drawings, where appropriate.

DETAILED DESCRIPTION

Figure 1:
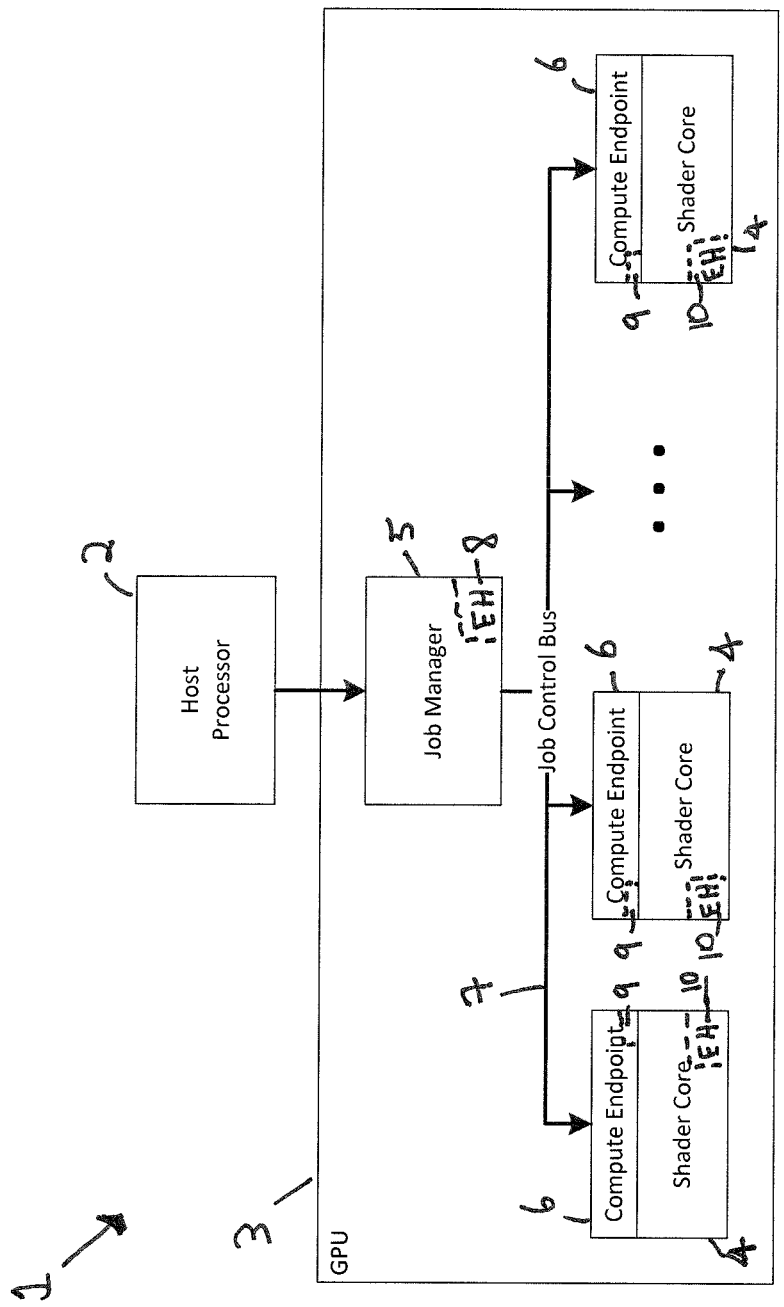
FIG. 1 shows schematically a microprocessor system that may be operated in the manner of the technology described herein.

A first embodiment of the technology described herein comprises a microprocessor system comprising:
one or more processing cores, each core operable to execute plural execution threads in parallel;
a task manager operable to issue tasks to the processing cores for processing; and
an exception handler operable to handle threads that encounter exceptions during their execution;
wherein:
at least one of the processing cores is configured such that if a thread it is executing encounters an exception or wishes to generate an exception, the processing core can trigger an exception event to the task manager;
the task manager is configured such that if it receives an indication of an exception event from a processing core, it broadcasts a cause exception message to at least one of the processing cores; and
the processing cores are configured to, if they receive a broadcast cause exception message from the task manager, identify any threads that the core is currently executing that the cause exception message applies to, and to redirect any such identified threads to the exception handler for handling.

A second embodiment of the technology described herein comprises a method of operating a microprocessor system that comprises:
one or more processing cores, each core operable to execute plural execution threads in parallel;
a task manager operable to issue tasks to the processing cores for processing; and
an exception handler operable to handle threads that encounter exceptions during their execution;
the method comprising:
a processing core when a thread that it is executing encounters an exception or wishes to generate an exception, triggering an exception event to the task manager;
the task manager when it receives the indication of an exception event from the processing core, broadcasting a cause exception message to at least one of the processing cores; and
each processing core that receives the broadcast cause exception message from the task manager, identifying any threads that the core is currently executing that the cause exception message applies to, and redirecting any such identified threads to the exception handler for handling.

The technology described herein relates to a microprocessor system that includes one or more processing cores that execute execution threads to be executed and an exception handler for handling threads that encounter exceptions. However, unlike in conventional systems, in the technology described herein, if a thread being executed encounters an exception or is to generate an exception, that event can be indicated to a task manager that is controlling the distribution of tasks to the processing core(s), and the task manager then broadcasts the exception event to the processing cores.

As will be discussed further below, this then allows a single exception encountered or triggered by a (single) thread in a processing core to be efficiently indicated to plural other threads, whether in the same or different processing cores. This then facilitates more efficient and effective exception handling in systems that, e.g., support and execute large numbers of independent threads in parallel. For example, the technology described herein can be used to efficiently terminate a parallel search or other goal driven algorithm that has been distributed across many independent execution threads (and, e.g., across plural processing cores).

The processing core or cores of the microprocessor system of the technology described herein can be any suitable processing cores, such as general processing cores, graphics processing cores (e.g. shader cores), anything that can function as an OpenCL "compute-unit", etc. In an embodiment, they are graphics processing cores. Each core is in an embodiment capable of executing plural independent threads of execution in parallel. In an embodiment the cores can execute up to 256 independent threads in parallel (at once).

The technology described herein is particularly applicable in systems that handle plural (and large numbers) of independent threads of execution, as in such circumstances the cost, e.g. for polling the independent threads when an exception occurs could increase notably. The technology described herein will also accordingly be advantageous in the case where there are a large number of independent processing cores, thread groups (thread warps), etc. However, this said, the technology described herein can also be used in cases where all threads are organised into a single thread group (warp) or, indeed, where there is only one or a few threads, if desired.

The system may comprise only a single processing core, but in an embodiment there are plural processing cores. In an embodiment there are 4 to 8 processing cores. Where there are plural processing cores, each core is in an embodiment operable in the manner of the technology described herein. Each core is in an embodiment of the same type (e.g. a graphics processing core).

The task manager is operable to issue tasks to be performed by the processing cores to the processing cores. The task manager can be operable to do this in any suitable and desired manner. The task manager may be implemented as desired, for example as a process executing on a microcontroller (MCU).

In one embodiment, the task manager is implemented as a fixed function hardware block that, in an embodiment, operates to iterate over the thread index space for a task to sub-divide it into smaller parts for execution.

The task manager (and its functions) could, if desired, be implemented in a "distributed" manner, for example in the form of a "task distribution network". In these arrangements, the task manager could comprise, e.g., multiple stages or layers, e.g. that each progressively sub-divide tasks to be performed into smaller groupings for execution.

Other arrangements for the task manager and the task distribution to the processing core or cores could be used, if desired.

In an embodiment, the task manager receives tasks from a host processor (e.g. a host CPU) that requires tasks to be performed by the processing cores (e.g. for applications that are executing on the host processor). The task manager will receive tasks from the host, and then issue processing associated with those tasks to the processing core or cores in an appropriate fashion. The host processor may, e.g., communicate tasks to the task manager by means of task commands.

Thus in an embodiment, the system of the technology described herein further includes a host processor that is operable to indicate tasks to be performed to the task manager for issue to the processing cores.

In an embodiment, the processing cores are all part of the same, overall processing unit, such as, and in an embodiment, a graphics processing unit (GPU). Thus, in an embodiment, the system comprises a host processor that communicates with and sends tasks to a processing unit which processing unit comprises the processing core or cores, and the task manager.

The task manager can distribute the processing for a task to be performed to the processing core or cores in any suitable and desired manner. Where there is only a single processing core, then the task manager should simply communicate the task to be performed to the processing core in the appropriate manner.

Where there are multiple processing cores, then the task manager in an embodiment distributes the processing for the task in question between the plural processing cores. In this case, the distribution of the processing for the task between the different processing cores can be done as desired. For example, where the processing for the task is already divided into identifiable parts or sets of processing, e.g., and in an embodiment into identifiable and distinct thread-groups (such as would be the case for an OpenCL kernel that has been divided into work groups), then the task manager in an embodiment operates to distribute the processing for the task between the different processing cores using the existing partitioning of the task.

Thus, in an embodiment, the processing for the task is divided into separate, distinct, thread groups (e.g. OpenCL work groups), and different thread groups (work groups) within a task are assigned to different processing cores. In an embodiment each individual thread group (work group) is assigned to a given processing core in its entirety (i.e. such that an individual thread group (work group) will not be divided between plural processing cores).

In an embodiment the task manager sub-divides the task into thread-groups. Thus, in an embodiment, the task manager is operable to take OpenCL ND Ranges and sub-divide them into work groups to be issued to the processing core(s).

The task manager may communicate with the processing cores in any desired and suitable manner, for example via an appropriate task control bus.

The task to be performed may be any suitable and desired task that may be performed by the processing core or cores in question. For example, each task could be OpenCL "kernel" (and in one embodiment this is the case). The task may equally be a corresponding construct to an OpenCL kernel, such as a kernel in Direct Compute, etc.

As is known in the art, under the OpenCL API, a "kernel" is a (usually small) program that is invoked a large number of times. A typical use of kernels is to perform a large computation in parallel, where each invocation of a kernel performs only a small part of the computation (for example for a given region of an image to be processed, or of a texture to be compressed). Each kernel invocation may be executed as an independent execution thread, and the kernel invocations (and thus the threads) may be executed in parallel.

A typical use of OpenCL is to use a graphics processing unit for highly parallel data processing operations, such as image processing (e.g. filtering), texture or other data array compression, iteratively solving differential equations, iterative searching processes, etc.

The task that is to be performed is in an embodiment a task that requires execution of a large number of independent execution threads and/or thread groups, such as, and in an embodiment, a goal driven algorithm, such as, and in an embodiment a parallel search. In the case of a parallel search, the search can be any desired form of search, such as simple brute force searching or heuristics-based searches (e.g. simulated annealing). It is in an embodiment a task where the task endpoint (e.g. goal) is likely to be reached by a thread or threads and/or thread groups at different times (i.e. such that the task endpoint will not happen immediately for all independent threads and/or thread groups).

Each task that is issued to the processing cores (to the task manager) should, as is known in the art, have associated with it the program (a sequence of instructions) that is to be executed for normal operation of the task (e.g., and in an embodiment, such that when the task is being executed, each execution thread runs the program in question).

The processing cores that receive a task from the task manager for execution should be operable to execute appropriate execution threads for performing the task in question (or at least the part of the task that the core is to perform). Thus, for example, in the case of executing an OpenCL "kernel", each processing core will execute a thread for each invocation of the kernel that the processing core is to process. Each thread in this case will correspond to an OpenCL work item.

To facilitate the handling, distribution and identification of the individual threads and which task they relate to, the threads in an embodiment carry and have associated with them appropriate indices, such as an appropriate kernel invocation index (ID) in the case of OpenCL.

Each processing core in an embodiment includes a thread execution control unit that is operable to receive the task related commands from the task manager and to issue (and control) threads for executing processing for the task on to the processing core in question. The thread execution control unit in an embodiment takes one or more thread groups (e.g. work groups) and issues corresponding threads (work-items) onto its associated processing core.

The exception handler can be configured and implemented in any desired and suitable way. It in an embodiment executes on the processing unit, e.g., GPU, that includes the processing cores. There is in an embodiment a unique instance of the exception handler per hardware thread which encounters an exception. Thus there may be, and in an embodiment is, multiple instances of the exception handler (multiple "exception handlers") in the system. The exception handler may also be implemented in a "distributed" form, if desired, for example with different processing stages and/or units of the overall processing unit (e.g. GPU) and/or processing cores together acting to provide the overall "exception handler" (exception handling process).

Threads can be redirected to reach the exception handler in any desired and suitable manner. In an embodiment the arrangement is such that as a thread completes its current instruction, it cycles through a point in the thread handling hierarchy (in an embodiment the thread execution control unit of the processing core that the thread is executing on), which then acts on the exception (if any) to redirect the thread to the exception handler. This allows the threads to reach the exception handler in an efficient but "lazy" manner.

The exception handler can handle threads that it receives in any desired and suitable manner and can be configured in any desired and suitable way to handle threads that are redirected to it. In an embodiment, the handling of a thread by the exception handler is dependent upon the nature of the exception that caused the thread to be redirected to the exception handler.

In an embodiment, the exception handler can perform one or more of, and in an embodiment all of the following in relation to a thread it receives (e.g., and in an embodiment, depending upon the nature of the exception that caused the thread to be redirected to the exception handler): terminate the thread; suspend the execution of the thread; resume the execution of the thread; and store trace data for the thread (and in an embodiment then cause the execution of the main program of the thread to be resumed). The exception handler can in an embodiment also, and does in an embodiment also, store state information relating to the thread and/or task in question, at least in the case of a suspend operation, so as to allow the thread and/or task to be resumed e.g. (either immediately or at a later point) if desired.

Where the exception handler is writing out trace data, that is in an embodiment written to an appropriate memory location (e.g. buffer), that is indicated as being the destination for the trace data.

The exception handler in an embodiment executes one or more programs for handling threads that it receives. In an embodiment, the exception handler executes a program that is associated with the task that the thread relates to when it receives a thread for handling.

To facilitate this operation, in an embodiment, as well as the program (sequence of instructions) that is to be executed for normal operation of the task, each task also has associated with it a second program (sequence of instructions) for suspending and/or terminating the thread which program is to be invoked (executed) when a thread associated with the task is redirected to the exception handler, and a third program that is to be invoked (executed) if (and when) a thread associated with the task is to be resumed after redirection to the exception handler.

Thus, in an embodiment, each task issued to the task manager contains a reference to (is associated with) three programs, the program to be invoked for normal operation of the task, a program to be invoked when threads for the task are redirected to the exception handler for suspending/terminating, and a program to be invoked when a thread that has been redirected to the exception handler is to be resumed. In an embodiment, references to these programs (the identity of the programs associated with the task) are indicated in metadata, such as a task descriptor, associated with and for the task in question.

The exception handler can be configured to perform the appropriate process in relation to a thread that it receives in any desired and suitable manner. For example, and in an embodiment, in the case of an event that is to trigger the termination of threads for a task that are redirected to the exception handler (e.g. because a parallel search or the reaching of some other goal by one thread has been completed), then the initial thread that triggers the exception in an embodiment causes the associated internal state of the task to be updated to identify the exception (thereby to indicate that the threads in question can be terminated). This will then cause subsequent (relevant) threads to be conditionally redirected to the exception handler for termination when they are dispatched for subsequent instructions.

The exception handler in an embodiment completes the behaviour desired based on the exception that has triggered the redirection of the thread to the exception handler.

Thus, in an embodiment, where the redirection to the exception handler is due to a completion of a parallel search, or the reaching of a goal, by one thread, when the first thread triggers the exception the task state is in an embodiment updated to indicate this, and the exception handler (the exception handling software) in an embodiment then uses this state to redirect and terminate threads.

If the redirection to the exception handler is due to a breakpoint or suspend operation, then the state relating to the task is in an embodiment stored to allow the task to be resumed at a later point. In this case, if the exception is caused by a processing core instruction, a value in memory is in an embodiment also set for the host CPU application to inspect.

Where the redirection to the exception handler is due to a trace point, then the exception handler in an embodiment writes out trace data to an append buffer (e.g. referenced by a constant register), and then resumes the main program. In an embodiment, the trace is for all threads in flight (thereby giving a "snap shot" of the status of the task across the thread "space" (e.g. NDRange in OpenCL).

The exception that triggers the redirection of a thread to the exception handler and the (potential) broadcast of a cause exception message can be any desired and suitable form of exception (i.e. event that indicates that the thread needs to be subjected to alternative processing (special handling)).

The Applicants have recognised that the technology described herein is particularly useful for exception behaviour or terminating tasks such as searches where an inexact failure (i.e. one which does not have to happen immediately for all independent threads or thread groups) occurs. Thus, in an embodiment, the exception of that triggers redirection to the exception handler is an event that can occur for a thread individually, without necessarily happening immediately or simultaneously for other threads or thread groups that are associated with the task in question.

The technology described herein also facilitates arrangements in which the programmer can identify in the program that the thread is executing an exception that needs to be messaged to other threads or thread groups working on the task. Thus, in an embodiment the exception that triggers the redirection of the thread to the exception handler and the (potential) broadcast of a cause exception message comprises an exception instruction that is included in the instruction stream for the task (by the programmer). In this regard, it will be appreciated that the technology described herein can be used for efficient tracing of task progress, for example, by including appropriate trace point instructions in the instruction stream to trigger the writing out of task progress information by plural independent threads executing for a task.

In an embodiment the exception is one of: a thread reaching some required, in an embodiment selected, in an embodiment predefined, condition, such as the completion of a search process or other goal driven algorithm; the thread reaching a breakpoint in its execution flow; the thread reaching a suspend point in its execution flow; and the thread reaching a trace point in its execution flow.

The exception is in an embodiment triggered by an instruction that the thread is executing, such as the completion of an instruction that indicates that the thread has reached some required precondition, a breakpoint instruction, a trace point instruction, etc.

In an embodiment, as well as an exception being provoked by an appropriate instruction in the instruction sequence for a thread (by a thread reaching an appropriate instruction in its instruction sequence), an exception can also be provoked by a command issued to the task manager for the processing cores by a host processor. In this case, the host processor will issue an exception triggering command to the task manager, and the task manager will then broadcast a cause exception event message to the processing core or cores as appropriate in response to receiving the exception command from the host processor.

Thus in an embodiment, an exception can be provoked in two ways: by an instruction in the processing core instruction stream (in the stream of instructions that a thread is executing); and by a command issued to the task manager by a host processor.

The exception event when a thread that is executing on a processing core encounters an exception can be indicated (communicated) to the task manager in any suitable and desired manner. In an embodiment the event is first communicated to the thread execution control unit (if any) of the processing core, and then by that thread execution control unit to the task manager (e.g. across the task control bus).

The task manager when it receives the exception event indication then broadcasts a cause exception message to at least one of the processing cores. Where there a plural processing cores, the cause exception message could be sent to only one, or to a selected number (but not all) of the plural processing cores, but in an embodiment it is broadcast to all the processing cores (to each processing core).

The cause exception message can be broadcast to the processing core or cores in any suitable and desired manner, e.g. via a bus connection between the task manager and the processing core(s).

A processing core, when it receives a broadcast cause exception message from the task manager, can operate to identify the threads that it currently has undergoing execution that the cause exception message is applicable to in any suitable and desired manner, e.g. based upon task identification information associated with the cause exception message. In an embodiment, the thread execution control unit (if any) of the processing core identifies the threads that the cause exception message applies to.

The processing core can similarly operate to redirect all the threads currently being executed that the cause exception message has been identified as applying to to the exception handler in any desired and suitable manner.

In an embodiment, the processing core that is executing the thread that triggers the exception event in an embodiment, when it receives the exception event indication from the thread, immediately identifies the threads that it is executing that the exception event applies to and forces those threads into the exception handler, without waiting to receive any broadcast cause exception message from the task manager.

While it would be possible to perform the operation of the technology described herein whenever any thread encounters an exception, in an embodiment the operation in the manner of the technology described herein (i.e. the indication of an exception event to the task manager and the subsequent broadcast of a cause exception message) is only performed for certain, in an embodiment selected, exception events (forms of exception). This will then allow the system to avoid broadcasting exception event messages, e.g., in the case where the exception that has been encountered is applicable to the thread in question only.

This operation may be achieved as desired. In one embodiment, the instruction that triggers the exception in the instruction sequence that the thread is executing is configured to indicate whether the exception (if triggered) should also trigger the broadcast of an exception event message. For example, and in an embodiment, the "exception" instruction could include a modifier or flag that if set triggers the broadcast of an exception event message.

Correspondingly, in an embodiment, it is possible for a broadcast exception event message to be applicable to some but not all of the threads relating to the task in question, and/or to different groupings of threads within the task in question. In an embodiment, the system supports one or more of, and in an embodiment all of: per-thread exceptions, thread group (e.g. work group) exceptions, task exceptions, and task chain exceptions (i.e. where plural tasks are associated or "chained" together in a sequence). Allowing exceptions to be broadcast (and thus applied to) different resolutions of threads within a given task and/or chain of tasks, will be advantageous, for example, for tracing, as it will allow traces for different resolutions of threads within a task (or tasks) to be generated.

Again, this operation can be achieved as desired, but in an embodiment the instruction that triggers the exception in the instruction sequence that the thread is executing and/or the broadcast exception event message (and in an embodiment both) is configured to indicate the thread "resolution" that it applies to, e.g., and in an embodiment, whether it applies to a thread group (work group), task, or chain of tasks (or applies to a single thread only). For example, the broadcast message may be modified to reach a work group, task, or chain (or have no modification if the exception is only intended to apply to a single thread).

Thus, in an embodiment, exception instructions can be included in the instruction sequence to be executed by threads for a task, which exception instructions can indicate whether the exception applies to the thread in question only, or should also be broadcast to other threads. In an embodiment, the exception instruction can also indicate that if it is to be broadcast other threads, what level of thread grouping the exception should be broadcast to (i.e. the range or "scope" that the exception applies to).

In the situation where an exception is to apply only to the thread group (work group) that the thread that triggered the exception belongs to, then in an embodiment the exception is broadcast to the thread group within the processing core in question, but is not communicated back to the task manager (outside of the processing core).

In an embodiment, the system is additionally or alternatively arranged such that any broadcast exception event message and exception is initially applied to the next larger grouping of threads for the task (e.g. to the work group to which the thread that triggered the exception belongs), and such that if all the threads in that thread group (e.g. all the work group threads) then exit with the same exception status, the exception broadcast is then propagated to the next higher level of thread grouping (e.g., and in an embodiment, to the task in question), and so on.

It would also be possible to control the broadcast of the exception event message based on whether the thread that triggered the exception returns from the exception handler (i.e. resumes it processing) or not (and in an embodiment this is done). In this case, if the thread that triggered the exception returns from the exception handler then the exception is in an embodiment not broadcast to other threads, but if the thread is terminated in the exception handler the exception is in an embodiment then broadcast to other (and in an embodiment to all other) threads.

In the case of an exception that is to apply to a single thread only (e.g. a trace point), the single thread will cause the exception, the thread will then jump to the exception handler, and, e.g., return from the exception handler or be terminated.

Once all the relevant threads have been directed into the exception handler, then if all the threads are terminated, then once all the exception handlers exit, the relevant work group, thread group, task, and/or task chain, will terminate, or it or they may resume if a return from exception instruction is issued (and the exception handler can in an embodiment execute a return from exception instruction that will resume the normal processing of threads that have been redirected to the exception handler).

The technology described herein can be implemented in any suitably configured microprocessor based system.

The various functions of the technology described herein can be carried out in any desired and suitable manner. For example, the functions of the technology described herein can be implemented in hardware or software, as desired. Thus, for example, unless otherwise indicated, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Subject to any hardware necessary to carry out the specific functions discussed above, the microprocessor system can otherwise include any one or more or all of the usual functional units, etc., that microprocessor systems include.

In an embodiment, the microprocessor system includes and/or is in communication with one or more memories or memory devices that store the data described herein and/or that store software for performing the processes described herein.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program comprising computer software code for performing the methods herein described when the program is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a processor, or microprocessor system comprising a data processor causes in conjunction with said data processor said processor, or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

A number of embodiments of the technology described herein will now be described. The present embodiments will be described primarily with reference to OpenCL concepts and terminology, but it will be appreciated by those skilled in the art that the present embodiments (and the technology described herein) are equally applicable to other forms of processing that can be performed in the corresponding manner.

FIG. 1 shows an exemplary microprocessor system 1 that may be operated in the manner of the technology described herein.

As shown in FIG. 1, the microprocessor system 1 includes a host processor 2 and a graphics processing unit (GPU) 3 that may perform processing operations in response to commands from the host processor 2 (e.g. for applications that are executing on the host processor 2).

The GPU 3 includes a number of processing cores 4 (in the present case in the form of shader cores). The GPU 3 may include more or less shader cores 4 than are shown in FIG. 1, and in some embodiments may only include a single shader core 4. (In OpenCL terms, each shader core 4 will correspond to an OpenCL "compute-unit", and the GPU 3 will correspond to the OpenCL "device".)

The graphics processing unit 3 also includes a job (task) manager 5 that acts as a task management unit to distribute and issue processing tasks received from the host processor 2 to the shader cores 4. The task manager 5 distributes processing for tasks to respective thread execution control units (compute endpoints) 6 of the shader cores 4 over a task (job) control bus 7. The task manager 5 may, e.g., be implemented as an appropriately programmed microcontroller (MCU).

In the present embodiments, the tasks for the host processor 2 are performed by executing execution threads on the shader cores 4 of the GPU 3. The GPU 3 is able to execute plural independent hardware threads per core (e.g. up to 256 independent threads per shader core 4). The shader cores 4 will each have a pipeline of tasks ready to execute, each of which tasks spawns work into the independent threads as they become available (i.e. finish their previous work). The threads when executing on a shader core will execute a sequence of shader instructions (i.e. kernel instructions in OpenCL).

When a task is to be performed by the GPU 3 (which may, e.g., be communicated to the GPU 3 via commands from the host processor 2), the task manager 5 will divide the task into thread groups to be issued to the respective shader cores 4. (Thus, in the case of an OpenCL compute task, the task manager 5 will take the OpenCL NDRange for the task and sub-divide it into work-groups to be issued to the respective shader cores 4.)

The task manager 5 issues the respective thread groups (work groups) to the respective compute endpoints (thread execution control units) 6 of the respective shader cores 4 via the task control bus 7. Each thread execution control unit (compute endpoint) 6 of a shader core 4 then takes its received thread group or groups (work groups) and issues corresponding threads (work items) on to its corresponding shader core for execution.

The microprocessor system 1 also includes an exception handler that threads that encounter exceptions in their processing are redirected to for special handling (as is known in the art). The exception handler executes software routines to handle appropriately any threads that are redirected to it.

In the present embodiment, the exception handler and the exception handling process is implemented in and using a number of the components of the microprocessor system 1. Exception handling "components" 8, 9 and 10 have been shown schematically in FIG. 1 to illustrate this.

In particular, the task manager 5 and the thread execution control units 6 act to broadcast exception messages, with exception handling hardware in the processing cores 4 then acting to redirect threads to the exception handling software routine based on the broadcast exception messages and any state associated therewith or with the threads. The software routines for exception handling run on the respective processing cores 4, and once the exception handling routines are complete, there is fixed function hardware in the thread execution control unit 6 that completes the processing core-level exception handling (e.g. suspend operation). Once the core-level exception handling is completed on each thread execution control unit 6, the task manager 5 correspondingly completes the task level execution handling (e.g. suspends or terminates the task).

Other arrangements for the exception handler and the exception handling process would, of course, be possible.

The exception handler in the present embodiments handles the threads that are redirected to it in accordance with the type of exception that has been encountered. For example, if the exception is due to completion of a parallel search or the reaching of a goal by one thread, then a value in memory is set indicating this, and the exception handler (exception handling software) checks that value and terminates threads that the value applies to immediately.

If the exception is due to a breakpoint or suspend operation, then the exception handler stores the state relating to the task to allow it to be resumed at a later point. In the case where this is triggered by a thread executing an instruction, a value is also set in memory for the host CPU application to inspect.

If the exception is due to a trace point, then the exception handler writes out trace data to a buffer, and then resumes the main program execution. The trace may be for all threads in flight (and the operation of the technology described herein facilitates this form of operation).

Figure 2:
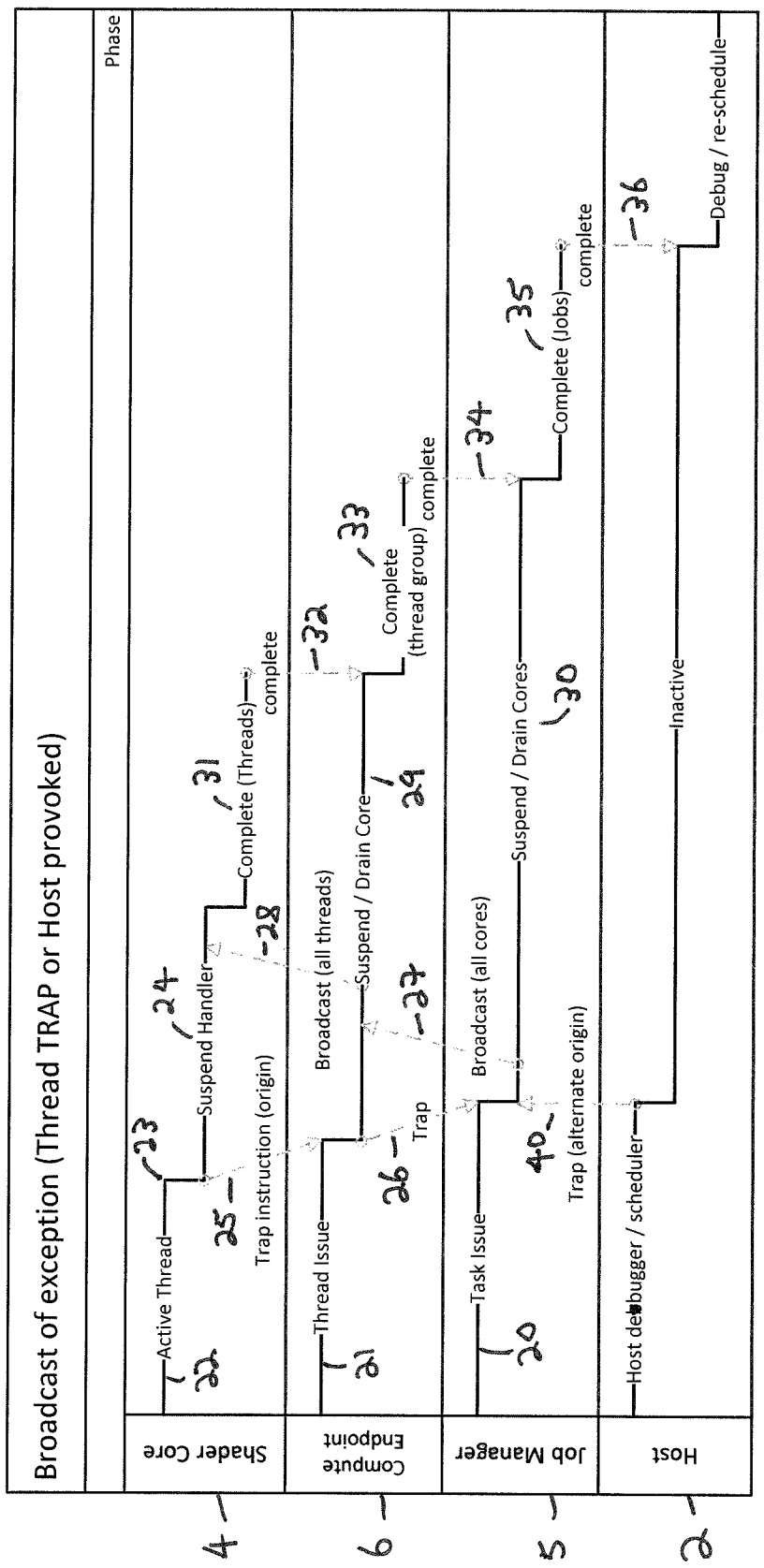
FIGS. 2 and 3 show schematically the operation of the microprocessor system of FIG. 1 in embodiments of the technology described herein.

FIG. 2 shows schematically the operation of the various components of the microprocessor system 1 in the described embodiments. Although FIG. 2 only illustrates a single shader core 4 and compute endpoint (thread execution control unit) 6, it will be appreciated that each of the shader cores 4 and compute endpoints 6 of the GPU 3 operate in a corresponding manner.

In operation of the microprocessor system 1 shown in FIG. 1 in the manner of the present embodiments, the host processor 2 will issue commands to the task manager 5 of the GPU 2 to perform tasks. The task manager 5 will then sub-divide the task to be performed into appropriate thread groups, and issue those thread groups to the thread execution control units 6 of the respective shader cores. Each thread execution control unit 6 will then take its thread group(s) and issue threads from the thread group(s) appropriately on to its shader core 4 for execution.

In the present embodiments, each task that is issued to the GPU 3 contains reference to three programs (sequences of instructions to be executed). The first program is the program invoked for normal operation of the task (i.e. when the task is being executed, each thread executing the task runs that program). The second program is a program that is invoked in the exception handler when the threads are redirected to the exception handler for suspending or terminating. The third program is a program that is invoked when the threads are to resume their normal processing after being redirected to the exception handler. These program references are indicated in metadata (a "task header") associated with the task in question.

FIG. 2 shows the process where the task manager 5 has issued a task 20 to the respective shader cores 4 such that the thread execution control units (compute endpoints) 6 of the respective shader cores 4 are issuing threads 21 to their respective shader cores 4 for execution 22. In an embodiment the threads that are executing on the shader cores 4 are truly independent hardware threads. The present embodiments can also be particularly usefully used, inter alia, in arrangements that have plural independent groups or sets of threads being processed, for example in so-called "warps" or "wavefronts".

As shown in FIG. 2, as a shader core 4 is executing its active threads 22, it is assumed that at some point a thread that is executing encounters 23 an exception in its instruction sequence. This exception may be triggered, e.g., by a trap, breakpoint, suspend or trace point instruction, or due to the completion of a parallel search or the reaching of a goal by the thread.

In response to the exception 23, the thread that encountered the exception will, as shown in FIG. 2, accordingly be redirected to the exception (suspend) [?] handler 24 (i.e. the program that the thread is executing will branch to the exception handler). However, in accordance with the technology described herein, the exception will also be communicated 25 to the thread execution control unit (compute endpoint) 6 for the shader core 4 in question.

In response to this, as shown in FIG. 2, the thread execution control unit (compute endpoint) 6 will correspondingly communicate 26 the exception event to the task (job) manager 5. Then, in response to receiving this exception event message, the task manager 5 will broadcast 27 a "cause exception message" to the thread execution control unit (compute endpoint) 6 of each shader core 4.

Each respective shader core thread execution control unit (compute endpoint) 6 then identifies the threads that its shader core is currently executing that the cause exception message relates to (by reference to an appropriate task identifier), and then broadcasts 28 a cause exception message 28 to all of those threads to redirect those threads to the exception handler. In this way, an exception caused by a single thread can be and is broadcast to all threads within the task.

As shown in FIG. 2, this operation will continue 29 until all the relevant threads for the task have been redirected to the exception handler for a given shader core, and correspondingly until all the shader cores handling threads for the task have been suspended and drained 30. Thus all the shader cores 4 will force all their threads into the exception handler, and once all the threads exit the exception handler, the task may be terminated.

As shown in FIG. 2, once the exception handling process has been completed 31 for the threads within a shader core, this is indicated back to the thread execution control unit 6 of the shader core. Correspondingly, once all the thread groups for a shader core have completed 33 their exception handling, this is indicated back to the task manager 5 and, correspondingly, once the exception handling for all the tasks in question (where the exception relates to plural tasks) has been completed 35, that is then indicated back to the host 36.

Once all the relevant threads have been directed into the exception handler, then if all the threads are terminated, then once all the exception handlers exit, the relevant work group, thread group, task, and/or task chain, will terminate. Alternatively, it or they may resume if a return from exception instruction is issued (and the exception handler can in an embodiment execute a return from exception instruction that will resume the normal processing of threads that have been redirected to the exception handler).

Figure 3:
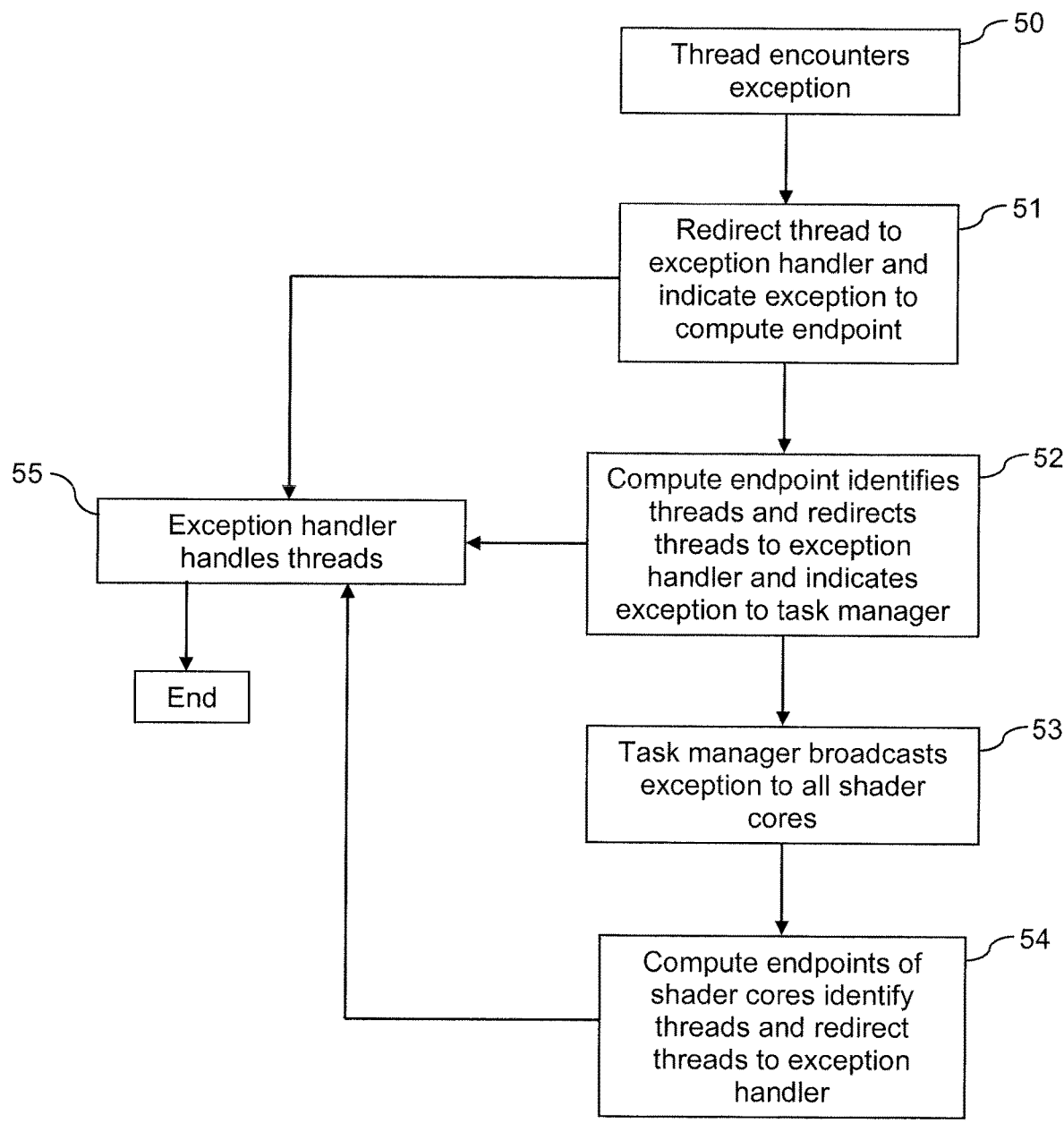

FIG. 3 is a flowchart showing the operation of the microprocessor system 1 shown in FIG. 1 in an embodiment of the technology described herein.

As shown in FIG. 3, when a thread for a task encounters an exception (step 50), the thread is then redirected to the exception handler 24 and the exception event is indicated to the thread execution control unit (compute endpoint) 6 for the shader core in question (step 51). The thread execution control unit (compute endpoint) 6 then identifies the threads that are currently being executed by a shader core that the exception applies to, and redirects those threads to the exception handler 24 (step 52). It also indicates the exception event to the task manager 5 (step 52).

In response to the exception event indication from the thread execution control unit, the task manager 5 broadcasts a cause exception message to all the shader cores (step 53).

In response to the broadcast cause exception message, the thread execution control units (compute endpoints) of all the shader cores identify the threads under their control that the cause exception message applies to, and redirect those threads to the exception handler accordingly (step 54).

The exception handler handles any threads that are redirected to it appropriately, until all the redirected threads have been completed (step 55).

In the present embodiments, the instruction that triggers the exception in the instruction sequence that the thread is executing is configured to indicate whether the exception (if triggered) should also trigger the broadcast of an exception event message or not. To facilitate this each "exception"-causing instruction includes a modifier or flag that if set triggers the broadcast of an exception event message. This then allows the system to avoid broadcasting exception event messages, e.g., in the case where the exception that has been encountered is applicable to the thread in question only.

The instructions that trigger exceptions in the instruction sequence that a thread is executing are also configured to indicate the thread "resolution" that the exception applies to (the scope or range of the exception), e.g., and in an embodiment, whether it applies to a thread group (work group), task, or chain of tasks (or applies to a single thread only).

The broadcast exception event messages are also configured to indicate the thread "resolution" that the broadcast applies to. For example, the broadcast message may be modified to reach a work group, task, or chain (or have no modification if the exception is only intended to apply to a single thread).

This facilitates broadcasting exception event messages that are applicable to some but not all of the threads relating to the task or tasks in question, and/or to different groupings of threads within the task or tasks in question. In the present embodiments, the system supports: per-thread exceptions, thread group (e.g. work group) exceptions, task exceptions, and task chain exceptions (i.e. where plural tasks are associated or "chained" together in a sequence).

In the case of an exception that is to apply to a single thread only (e.g. a trace point), the single thread will cause the exception, that thread will then jump to the exception handler, and, e.g., return from the exception handler or be terminated.

The present embodiments also support the triggering of exceptions and the broadcast of exception event messages by means of commands issued to the GPU 3 (to the task manager 5 on the GPU 3) by the host processor 2.

FIG. 2 illustrates this operation, and shows an exemplary cause exception command 40 that may be sent, e.g., from a debugger/scheduler that is executing on the host 2. In response to this cause exception command from the host 2, the task manager 5 will again broadcast 27 an appropriate cause exception message to all the shader cores over the task control bus 7, with the shader cores then acting to redirect the relevant threads to the exception handler in the manner discussed above.

Various alternatives and modifications to the operation of the above embodiments would be possible, if desired.

For example, where an exception is to apply only to the thread group (work group) that the thread that triggered the exception belongs to, then the exception could be broadcast to the thread group within the processing core in question, without being communicated back to the task manager (outside of the processing core).

A broadcast exception event message and exception could be initially applied to the next larger grouping of threads for the task (e.g. to the work group to which the thread that triggered the exception belongs), with the exception broadcast then being propagated to the next higher level of thread grouping (e.g., and in an embodiment, to the task in question) only if all the threads in the thread group (e.g. all the work group threads) then exit with the same exception status (and so on).

It would also be possible to control the broadcast of the exception event message based on whether the thread that triggered the exception returns from the exception handler (i.e. resumes it processing) or not. In this case, if the thread that triggered the exception returns from the exception handler then the exception is in an embodiment not broadcast to other threads, but if the thread is terminated in the exception handler the exception is in an embodiment then broadcast to other threads.

As can be seen from the above, the technology described herein, in its embodiments at least provides a mechanism for efficiently handling exceptions in many threaded processors that are executing plural independent threads in parallel. This can then facilitate, for example, efficiently terminating parallel searches or other goal-driven algorithms, statefully suspending a program comprising many threads, and handling breakpoints in and profiling of programs comprised of many threads. In a many threaded parallel processing operation, each thread can reach the exception handler in an efficient way at its earliest opportunity (where, for example, the exceptions can then be recovered from appropriately).

This is achieved, in the embodiments of the technology described herein at least, by broadcasting an exception caused by a single thread within a task to other (and in an embodiment to all other) threads within the task.

The foregoing detailed description of the technology described herein has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical application, to thereby enable others skilled in the art to best utilise the technology described herein in various embodiments and with various modifications as are suited to the particular use contemplated. It is intended that the scope of the technology described herein be defined by the claims appended hereto.

What is claimed is:

1. A graphics processing unit (GPU) comprising:
a plurality of processing cores, each core operable to execute plural execution threads in parallel;
task manager circuitry operable to issue tasks to the plurality of processing cores for processing, wherein each task is associated with a program, wherein the program comprises a sequence of instructions;
wherein each processing core of the plurality of processing cores is operable to receive a task from the task manager circuitry, and to execute the received task with the associated sequence of instructions by executing plural execution threads in parallel; and
exception handler circuitry to handle threads that encounter exceptions during their execution by a processing core of the plurality of processing cores;
wherein:
at least one of the processing cores of the plurality of processing cores is configured to, in response to a thread that it is executing in respect of a task received from the task manager circuitry encountering an exception or wishing to generate an exception, as a result of an instruction that the thread is executing:
  when the instruction which caused the exception indicates that the exception applies only to the thread which has encountered it or that wishes to generate the exception, direct the thread to the exception handler for termination or suspension without triggering an indication of an exception event to the task manager circuitry; and
  when the instruction which caused the exception indicates that the exception does not apply only to the thread which has encountered it or that wishes to generate the exception, trigger an indication of an exception event to the task manager circuitry;
wherein the task manager circuitry is configured to, when it receives an indication of an exception event from the at least one of the processing cores of the plurality of processing cores, broadcast a cause exception message to at least one of any of the processing cores of the plurality of processing cores, the cause exception message associated with a thread resolution to which the cause exception message applies, the thread resolution indicating whether the cause exception message applies to a single particular thread, a particular group of threads associated with a particular task, or a particular group of threads associated with a chain of particular tasks; and one or more of the processing cores of the plurality of processing cores are configured to, when they receive a cause exception message broadcast from the task manager circuitry, identify any threads that the core is currently executing in respect of a task received from the task manager circuitry that the cause exception message applies to based at least on the thread resolution associated with the cause exception message and which should therefore be terminated or suspended, and to redirect any such identified threads to the exception handler circuitry for handling, wherein handling by the exception handler circuitry comprises terminating or suspending the execution of said identified threads which are redirected to the exception handler circuitry.

2. The system of claim 1, wherein the processing cores are graphics processing cores.

3. The system of claim 1, further comprising a host processor that is operable to indicate tasks to be performed to the task manager circuitry for issue to the processing cores.

4. The system of claim 1, wherein the task that is to be performed is a parallel search or other goal driven algorithm.

5. The system of claim 1, wherein the exception handler circuitry is configured to also perform one of the following in relation to a thread it receives: resume the execution of the thread; store trace data for the thread; and store state information relating to the thread and/or task in question.

6. The system of claim 1, wherein each task that is issued to the processing cores has associated with it: a first program that is to be executed for normal operation of the task; a second program for suspending and/or terminating a thread when a thread associated with the task is redirected to the exception handler circuitry for suspending and/or terminating; and a third program for resuming a thread after redirection to the exception handler circuitry.

7. The system of claim 1, wherein the exception that triggers the redirection of a thread to the exception handler circuitry is one of: the thread reaching the completion of a search process or other goal driven algorithm; the thread reaching a breakpoint in its execution flow; the thread reaching a suspend point in its execution flow; and the thread reaching a trace point in its execution flow.

8. The system of claim 1, wherein an exception can be provoked by an instruction in the stream of instructions that a thread is executing, and by a command issued to the task manager circuitry by a host processor.

9. The system of claim 1, wherein the instruction that results in the exception when executed by a thread executing on at least one of the processing cores of the plurality of processing cores indicates a level of thread grouping the exception applies to, wherein the level of thread grouping indicated is one of: a thread group, or a grouping higher than a thread group.

10. The system of claim 9, wherein the processing core is configured to, when an exception is caused by an instruction indicating a level of thread grouping which the exception applies to:
when the instruction indicates a level of thread grouping which is a thread group, communicate the exception to a thread group within the processing core without triggering an indication of an exception event to the task manager circuitry; and
when the instruction indicates a level of thread grouping which is higher than a thread group, trigger an indication of an exception event to the task manager circuitry.

11. The system of claim 1, wherein the GPU is configured to communicate and apply a cause exception message to successively higher levels of thread grouping, provided that at each level of thread grouping the threads associated with that level of thread grouping do not resume after being directed to the exception handler.

12. A method of operating a graphics processing unit (GPU) that comprises:
a plurality of processing cores, each core operable to execute plural execution threads in parallel;
task manager circuitry operable to issue tasks to the plurality of processing cores for processing, wherein each task is associated with a program, wherein the program comprises a sequence of instructions;
wherein each processing core of the plurality of processing cores is operable to receive a task from the task manager circuitry, and to execute the received task with the associated sequence of instructions by executing plural execution threads in parallel; and
exception handler circuitry to handle threads that encounter exceptions during their execution by a processing core of the plurality of processing cores;
the method comprising:
a processing core of the plurality of processing cores, in response to a thread that it is executing in respect of a task received from the task manager circuitry encountering an exception or wishing to generate an exception, as a result of an instruction that the thread is executing:
redirecting the thread to the exception handler for termination or suspension; and
in response to the instruction which caused the exception indicating that the exception does not apply only to the thread which has encountered it or that wishes to generate the exception, triggering an indication of an exception event to the task manager circuitry;
the task manager circuitry, in response to receiving the indication of an exception event from the processing core of the plurality of processing cores, broadcasting a cause exception message to at least one other processing core of the plurality of processing cores, the cause exception message associated with a thread resolution to which the cause exception message applies, the thread resolution indicating whether the cause exception message applies to a single particular thread, a particular group of threads associated with a particular task, or a particular group of threads associated with a chain of particular tasks; and
in each processing core of the at least one other processing core that receives the cause exception message broadcast from the task manager circuitry, identifying any threads that the core is currently executing in respect of a task received from the task manager circuitry that the cause exception message applies to based at least on the thread resolution associated with the cause exception message, and which should therefore be terminated or suspended, and redirecting any such identified threads to the exception handler circuitry for handling, wherein handling by the exception handler circuitry comprises terminating or suspending the execution of said identified threads which are redirected to the exception handler circuitry.

13. The method of claim 12, wherein the exception handler circuitry also performs one or more of the following in relation to a thread it receives: resuming the execution of the thread; storing trace data for the thread; and storing state information relating to the thread and/or task in question.

14. The method of claim 12, comprising associating with a task that is issued to the processing cores: a first program that is to be executed for normal operation of the task; a second program for suspending and/or terminating a thread when a thread associated with the task is redirected to the exception handler circuitry for suspending and/or terminating; and a third program for resuming a thread after redirection to the exception handler circuitry.

15. The method of claim 12, wherein the exception that triggers the redirection of the thread to the exception handler circuitry is one of: the thread reaching the completion of a search process or other goal driven algorithm; the thread reaching a breakpoint in its execution flow; the thread reaching a suspend point in its execution flow; and the thread reaching a trace point in its execution flow.

16. The method of claim 12, comprising the processing core only indicating an exception event to the task manager circuitry for selected forms of exception.

17. The method of claim 12, wherein the instruction that results in the exception when executed by a thread on at least one of the processing cores of the plurality of processing cores indicates a level of thread grouping the exception applies to, wherein the level of thread grouping the exception applies to is one of: a thread group, or a grouping higher than a thread group.

18. The method of claim 17, comprising the processing core, when an exception is caused by an instruction indicating a level of thread grouping which the exception applies to:
when the instruction indicates a level of thread grouping which is a thread group, communicating the exception to a thread group within the processing core without triggering an indication of an exception event to the task manager circuitry; and
when the instruction indicates a level of thread grouping which higher than a thread group, triggering an indication of an exception event to the task manager circuitry.

19. The method of claim 12, wherein the microprocessor system communicates and applies a cause exception message to successively higher levels of thread grouping, provided that at each level of thread grouping the threads associated with that level of thread grouping do not resume after being directed to the exception handler.

20. A non-transitory computer readable medium having software code stored thereon which, when executing on a processor performs a method of operating a graphics processing unit (GPU) that comprises:
a plurality of processing cores, each core operable to execute plural execution threads in parallel;
task manager circuitry operable to issue tasks to the plurality of processing cores for processing, wherein each task is associated with a program, wherein the program comprises a sequence of instructions;
wherein each processing core of the plurality of processing cores is operable to receive a task from the task manager circuitry, and to execute the received task with the associated sequence of instructions by executing plural execution threads in parallel; and
exception handler circuitry to handle threads that encounter exceptions during their execution by a processing core of the plurality of processing cores;
the method comprising:
a processing core of the plurality of processing cores, in response to a thread that it is executing in respect of a task received from the task manager circuitry encountering an exception or wishing to generate an exception, as a result of an instruction that the thread is executing:
redirecting the thread to the exception handler for termination or suspension; and
in response to the instruction which caused the exception indicating that the exception does not apply only to the thread which has encountered it or that wishes to generate the exception, triggering an indication of an exception event to the task manager circuitry;
the task manager circuitry, in response to receiving the indication of an exception event from the processing core of the plurality of processing cores, broadcasting a cause exception message to at least one other processing core of the plurality of processing cores, the cause exception message associated with a thread resolution to which the cause exception message applies, the thread resolution indicating whether the cause exception message applies to a single particular thread, a particular group of threads associated with a particular task, or a particular group of threads associated with a chain of particular tasks; and
in each processing core of the at least one other processing core that receives the cause exception message broadcast from the task manager circuitry, identifying any threads that the core is currently executing in respect of a task received from the task manager circuitry that the cause exception message applies to based at least on the thread resolution associated with the cause exception message, and which should therefore be terminated or suspended, and redirecting any such identified threads to the exception handler circuitry for handling, wherein handling by the exception handler circuitry comprises terminating or suspending the execution of said identified threads which are redirected to the exception handler circuitry.

* * * * *